United States Patent
Gerdes et al.

(10) Patent No.: US 7,059,056 B2
(45) Date of Patent: Jun. 13, 2006

(54) WHEEL CENTERING SYSTEM FOR VEHICLE SERVICE DEVICES

(75) Inventors: Michael D. Gerdes, St. Peters, MO (US); Nicholas J. Colarelli, Creve Coeur, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/040,084

(22) Filed: Jan. 21, 2005

(65) Prior Publication Data

US 2005/0126020 A1    Jun. 16, 2005

Related U.S. Application Data

(62) Division of application No. 10/685,009, filed on Oct. 14, 2003.

(51) Int. Cl.
*G01B 5/20*    (2006.01)

(52) U.S. Cl. .......................... 33/203; 33/600; 33/544.4

(58) Field of Classification Search ............... 33/544.4, 33/555.1, 555.3, 203, 533, 600, 644, 613, 33/645, 677, 542, 549; 73/484, 487, 462
See application file for complete search history.

(56) References Cited

U.S. PATENT DOCUMENTS

| | | | | |
|---|---|---|---|---|
| 69,954 A | * | 10/1867 | Richards | 33/544.4 |
| 1,628,741 A | * | 5/1927 | Holt et al. | 33/542 |
| 2,631,452 A | * | 3/1953 | Hutter | 73/484 |
| 3,426,601 A | * | 2/1969 | McCowan | 73/484 |
| 4,524,525 A | * | 6/1985 | Finkler | 33/544.4 |
| 5,131,162 A | * | 7/1992 | Miller | 33/562 |
| 5,969,247 A | * | 10/1999 | Carter et al. | 73/462 |
| 5,987,761 A | | 11/1999 | Ohnesorge | |
| 6,105,270 A | * | 8/2000 | Capetta et al. | 33/645 |
| 6,205,670 B1 | * | 3/2001 | Webb | 33/542 |
| 6,279,244 B1 | * | 8/2001 | Kelley | 33/555.1 |
| 6,481,281 B1 | * | 11/2002 | Gerdes | 73/487 |
| 6,732,585 B1 | * | 5/2004 | Cunningham et al. | 73/487 |
| 6,772,631 B1 | * | 8/2004 | Hansen | 73/487 |
| 6,854,194 B1 | * | 2/2005 | Hansen | 33/520 |
| 2003/0051548 A1 | | 3/2003 | Hansen | |

* cited by examiner

*Primary Examiner*—Diego Gutierrez
*Assistant Examiner*—Travis Reis
(74) *Attorney, Agent, or Firm*—Polster, Lieder, Woodruff & Lucchesi, L.C.

(57) ABSTRACT

A system and method for centered mounting of a rotating body upon a spindle shaft. The system includes a set of double low-tapers cones arranged and identified according to size. A guide is provided to identify an appropriate cone from the set for a given rotating body pilot hole diameter.

10 Claims, 3 Drawing Sheets

WHEEL CENTERING SYSTEM FOR VEHICLE SERVICE DEVICES

CROSS-REFERENCE TO RELATED APPLICATIONS

The present application is a divisional application of co-pending U.S. patent application Ser. No. 10/685,009 filed on Oct. 14, 2003, from which priority is claimed, and herein incorporated by reference.

STATEMENT REGARDING FEDERALLY SPONSORED RESEARCH

Not Applicable.

BACKGROUND OF THE INVENTION

The present invention relates generally to vehicle wheel balancer and brake lathe systems, and in particular, to components configured to facilitate the centered mounting of vehicle wheels having a variety of hub pilot hole sizes and lug hole configurations on a vehicle wheel balancer spindle, as well as the centered mounting of a vehicle brake drum or brake rotor onto a brake lathe machine.

A variety of components are utilized to facilitate the centered mounting of vehicle wheels on a vehicle wheel balancer system, and the centered mounting of vehicle brake drums or brake rotors on brake lathes. Centering cones fitted over the spindle shaft of the wheel balancer or brake lathe system provide a center support sized to receive a corresponding hub pilot hole of the wheel, brake rotor, or brake drum. Due to the lack of standardization of hub pilot hole diameters on automobiles, there is a large range of hub pilot hole diameters which centering cones must encompass. A centering cone is configured with an axial bore of uniform diameter, sized to fit over the spindle shaft of the wheel balancer or brake lathe system. To accommodate as many wheels, brake rotors, or brake drums as possible, the outer surface of each cone is tapered to provide a frustoconical surface to receive the inner surface of a hub pilot hole.

It is known to those of ordinary skill in the balancer field that a lower included angle on a centering cone will provide for better centering of an associated wheel, brake rotor, or brake drum. However, to encompass the entire required range of hub pilot hole diameters which are commonly seen in the vehicle service industry with low-included angle centering cones, a greater number of centering cones is required. In order to ensure complete coverage of a range of pilot hole diameters, it is further desirable to provide for some degree of "overlap" in each centering cone. The "overlap" can be defined as the portion of each subsequent centering cone in a set which has the same range of diameters. Alternatively, this can be described as the situation where the major diameter of a centering cone is slightly larger than the minor diameter of the next larger centering cone in the set.

The total number of centering cones required to cover a specific range of hub pilot hole diameters is defined by the angle chosen for the conical taper, the length of the taper, and the amount of overlap desired between each centering cone in the set. Typical centering cones used with automotive service equipment have a single taper on each piece, and a minimum amount of overlap. From here on "taper" will be defined as having all the dimensions necessary to define a frustoconical portion of a cone: maximum diameter, minimum diameter, and the included angle.

Traditionally centering cones have been approximately 1.5" to 2.0" tall. This has been done to minimize the number of cones required to cover a desired range of pilot diameters. Current design trends in automotive wheels are producing many wheels with diameters inside the center bore that are smaller than the pilot diameter. For proper centering it is necessary for the centering cone to contact the wheel on the proper pilot diameter only. Not one of the alternate diameters inside the center bore. This is making it necessary to design centering cones that are shorter than in the past. Many cone manufacturers are releasing many short cones to cover these applications.

One system for minimizing the number of centering cones required in a set is to utilize centering cones having two opposing tapers on the same unit. These centering cones are of unitary construction, having their maximum diameters centrally disposed, such that the cone is merely reversed on the spindle to switch from one taper to the other. In order to ensure complete coverage for the entire range of pilot hole diameters likely to be encountered during vehicle service, a significant amount of overlap is provided between tapers. However, it has been found that when cones are provide with relatively small included angles, i.e., low taper angles, and small differences in diameters, it becomes difficult for an operator to distinguish one cone from another. The typical method for selecting a suitable cone for use is to look at the pilot hole diameter of the wheel, brake rotor, or brake drum, and make an educated guess as to which cone is most suitable, A trial and error process then ensues until a suitable centering cone is found. Accordingly, it would be highly desirable to provide a method for selecting and identifying suitable centering cones for use in mounting a vehicle wheel, brake rotor, or brake drum on a rotating spindle of a balancer or lathe which does not require extensive trial and error.

BRIEF SUMMARY OF THE INVENTION

Briefly stated, the preferred embodiment of the present invention provides a system for mounting a vehicle wheel upon a wheel balancer spindle. The system includes a set of double low-taper centering cones arranged and identified according to size. A guide is provided to identify an appropriate centering cone from the set for a given vehicle wheel pilot hole diameter.

In an alternate embodiment of the present invention, a set of double low-taper cones are provided with one or more identifying indicia selected from a set of indicia including colors, annular grooves, numbers, varying diameter rings, varying width rings, and varying width slots. An application guide is provided to correlate vehicle make, model, and year information with a double low-taper cone from the set of cones, identified with the one or more identifying indicia. Preferably, the application guide is in an electronic format.

In an alternate embodiment of the present invention, a method for storing a set of double low-taper cones is provided in which set of cones is stored in a logical arrangement according to taper size, facilitating manual selection of a suitable double low-taper cone for use.

In an alternate embodiment of the present invention, a method for identifying a double low-taper cone from a set of cones is provided. The method includes the step of measuring the pilot hole diameter of a workpiece such as a vehicle wheel, brake rotor, or brake lathe to be centered upon a spindle. The measured pilot hole diameter is correlated with a index of double low-taper cones in the set, and the operator is provided with a visual indication of a preferred cone for use with the measured pilot hole diameter.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
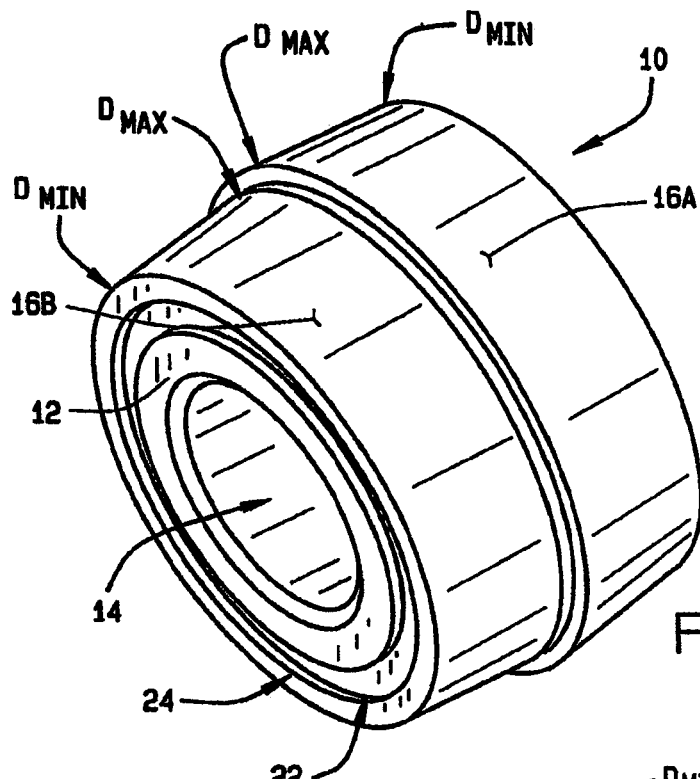
FIG. 1 is a perspective view of a low taper double-cone of the present invention with first and second marking indicia.
Figure 2:
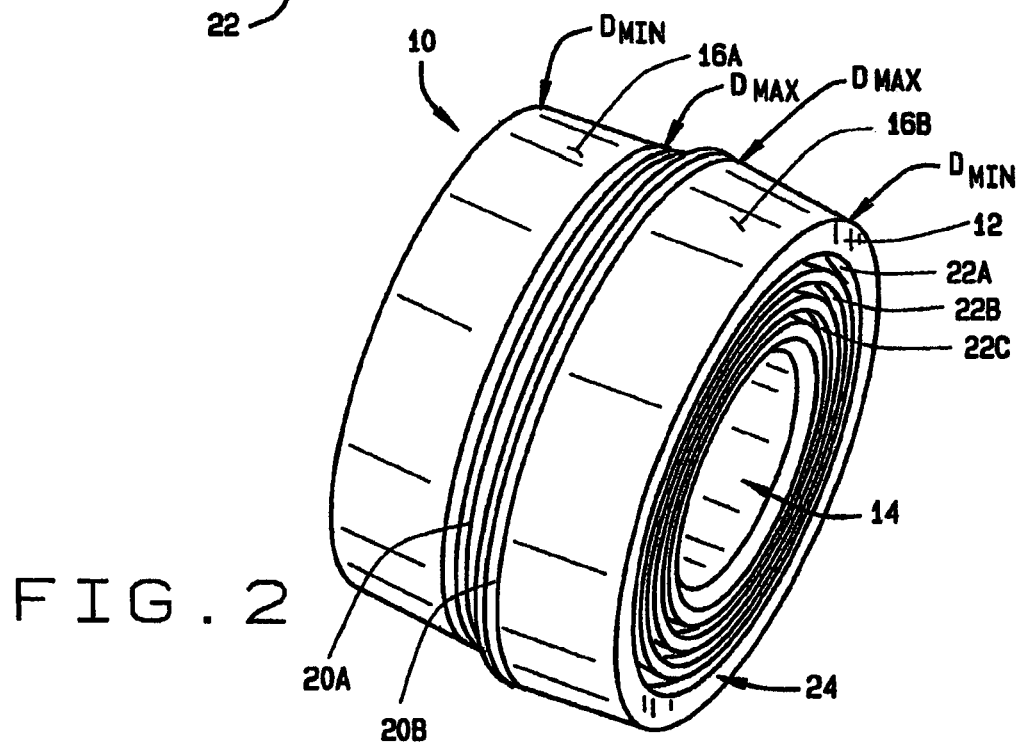
FIG. 2 is a perspective view of a low taper double-cone of the present invention with third and fourth marking indicia.
Figure 3:
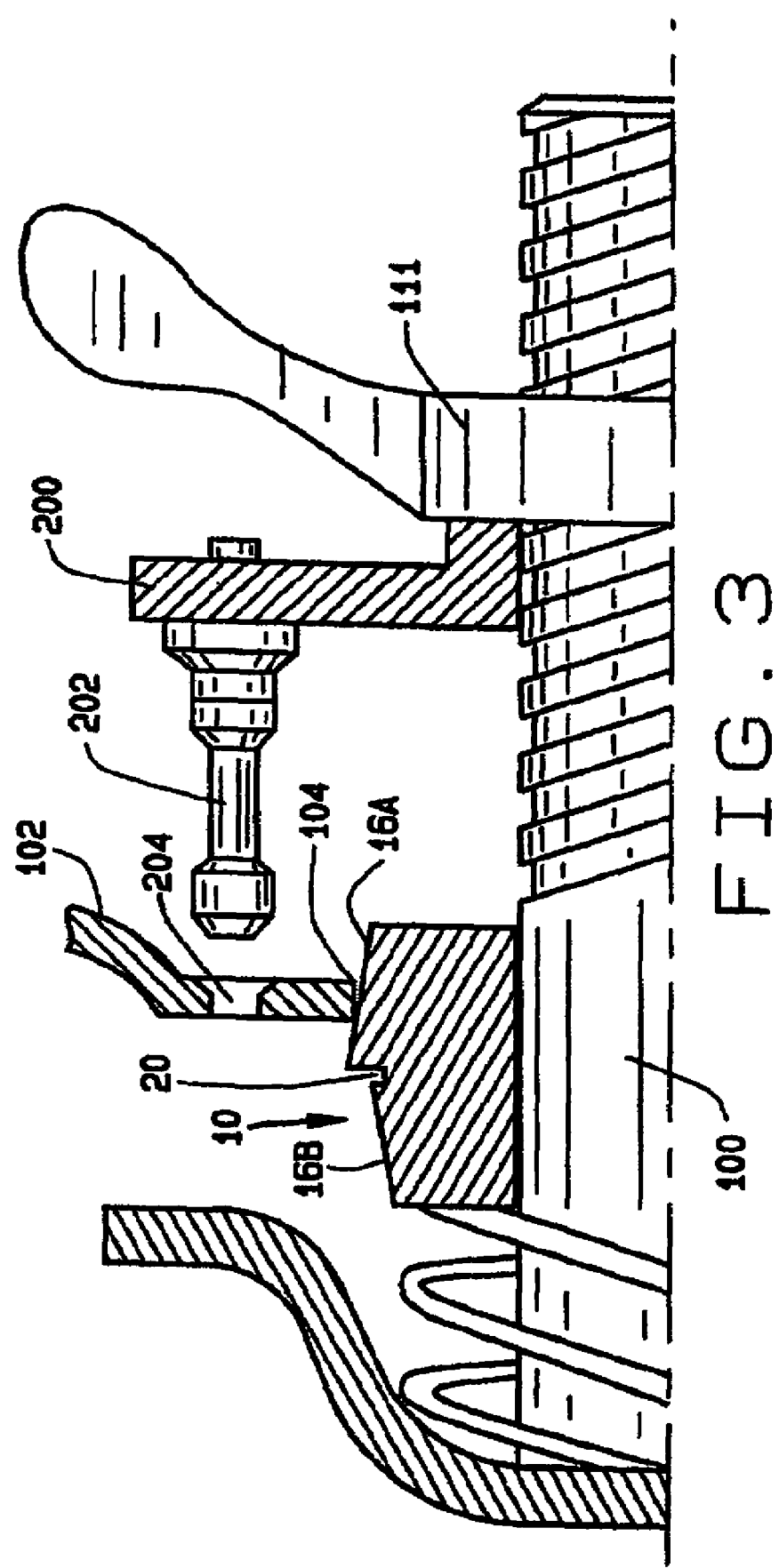
FIG. 3 is a axial section of half of a low taper double-cone of the present invention centering a vehicle wheel on a balancer spindle prior to clamping engagement from a mounting flange.

While the present invention will be described below in the context of a vehicle wheel balancer system, those of ordinary skill in the art will recognize that the methods and apparatus disclosed herein are equally applicable to a variety of systems which require the centered mounting of a rotating body, including, but not limited to, brake rotors and brake drums on brake lathe systems. To provide a system of the present invention with components to center a vehicle wheel upon a wheel balancer spindle for balancing, a set of double low-taper centering cones 10 are utilized, such as shown in FIGS. 1 and 2. Each centering cone 10 consists of a unitary cylindrical body 12, having an axial bore 14 of uniform diameter sized to seat on a balancer or lathe spindle 100, such as shown in FIG. 3. The outer surface of the body 12 is consists of a pair of low-taper surfaces 16A, 16B. Each low taper surface has a minimum diameter $D_{min}$ adjacent an end of the body 12, and a maximum diameter $D_{max}$ adjacent a longitudinal midline of the body 12.

Each centering cone 10 is provided with one or more identifying indicia. Turning to FIG. 1, the centering cone 10 illustrated includes as a first indicia, a single circumferential groove 20 disposed between the pair of low-taper surfaces 16A and 16B. The circumferential groove 20 is preferably marked with an identifying color, providing a unique visual identifier to an operator. A second indicia, consisting of a single wide annular channel 22 disposed on an end face 24 of the centering cone 10 is preferably marked with an identifying color, which may be the same as the color provided in the annular groove 20, or distinct there from.

Turning to FIG. 2, additional forms of identifying indicia are shown. Specifically, in FIG. 2, the centering cone 10 is provided with a set of narrow circumferential grooves 20A, 20B disposed between the pair of low-taper surfaces 16A and 16B. Each circumferential groove 20A, 20B is preferably marked with an identifying color to provide the operator with a unique visual identifier for the centering cone 10. A set of narrow annular channels 22A, 22B, and 22C are disposed on an end face 24 of the centering cone 10. Each annular channel is preferably marked with an identifying color, which may be the same as the color provided in the set of circumferential grooves 20A, 20B, or distinct there from.

Those of ordinary skill in the art will recognize that the circumferential grooves 20, annular channels 22, the diameters or widths thereof, and the identifying colors may be utilized in combination or individually to provide a wide range of unique identifying indicia for each centering cone 10. For example, a set of seven centering cones 10, defining a total of 14 low taper surfaces, may be provided with identifying indicia which consists only of single wide annular channels 22 disposed on each end face 24, and filled with unique colors such as red, orange, yellow, green, blue, black, and white. Alternatively, a set of centering cones 10 may be divided into logical subsets of closely related low taper surfaces using combinations of identifying indicia. Similarly, a subset of three related centering cones 10 may be distinguished by a first centering cone 10 of the subset having single circumferential groove 20 with a white color, a second centering cone 10 of the subset having a pair of narrow circumferential grooves 20A and 20B, with a white color, and a third centering cone 10 of the subset having three narrow circumferential grooves 20A, 20B, and 20C with a white color.

Preferably, selection of a centering cone 10 having identifying indicia is facilitated by the use of an application chart or electronic selection guide. For example, for use in centering a vehicle wheel 102 in a vehicle wheel balancer application, such as shown in FIG. 3, it is required to select a centering cone 10 having a tapered surface 16A or 16B which is sufficient to engage the inner surface of a wheel pilot hole 104, thereby centering the vehicle wheel 102 about the centering cone 10, and correspondingly, about the spindle 100 of the balancer upon which the centering cone 10 is mounted. An application chart or electronic selection guide can provide a predetermined table correlating the taper dimensions of centering cones 10 in a set with the pilot hole dimensions of original equipment vehicle wheels optionally identified by vehicle make, model, and year. An operator is required to either look up on a chart, or input to a computer, the identifying vehicle or wheel information, to locate the corresponding centering cone 10 with the identifying indicia.

Figure 4:
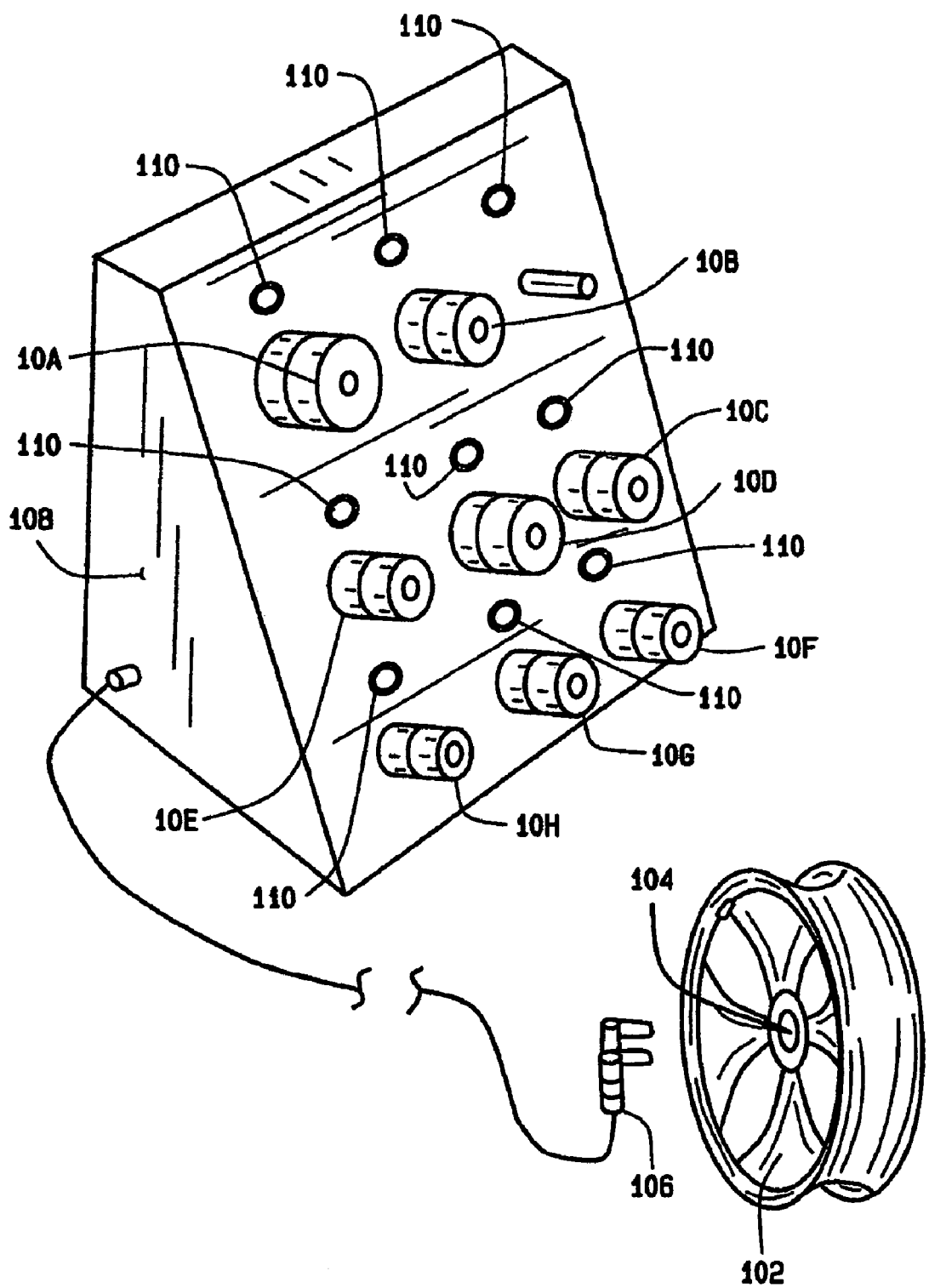
FIG. 4 is a perspective view of a storage rack and indicator system for storing a set of low taper double-cones of the present invention.

An alternate method for selecting a centering cone 10 having a tapered surface 16A or 16B which is sufficient to engage the inner surface of a wheel pilot hole 104 includes utilizing an electronic gauge 106. As shown in FIG. 4, the electronic gauge 106 is used to measure an inner diameter of the wheel pilot hole 104. The electronic gauge is operatively coupled to a storage rack 108 on which a set of centering cones 10A–10H are stored. Adjacent each centering cone 10A–10H on the storage rack 108 is an indicator light 110, and an identifying indicia corresponding to the identifying indicia on an associated centering cone 10A–10H. A processor or logic circuit operatively coupled to the electronic gauge 106 activates the light 110 adjacent a centering cone 10 having a tapered surface dimension corresponding to the wheel pilot hole 104 dimensions obtained with the electronic gauge.

Optionally, the centering cones 10 in a set of cones are stored or arranged on the storage rack 108 in a logically related manner, such that should an operator find that a chosen centering cone 10 has tapered surfaces 16A and 16B which are either too small or too large, the centering cone 10 having the next incremental sizes of tapered surfaces 16A and 16B is readily accessible, preferably stored in an adjacent position on the storage rack 108.

Once a centering cone 10 has been identified or selected, it is mounted on the spindle 100 with the desired tapered surface 16A or 16B facing outward, as shown in FIG. 3. The vehicle wheel 102 is then positioned on the spindle 100, and the wheel pilot hole inner surface seated on the outward-facing tapered surface 16A or 16B of the centering cone 10. To secure the vehicle wheel 102, a vehicle wheel mounting flange assembly 200 having one or more mounting pins 202, is disposed on the spindle 100 and brought into engagement with the vehicle wheel 102, such that each mounting pin 202 seats in an axially aligned lug hole 204. The vehicle wheel mounting flange assembly 200 is clamped against the vehicle wheel 102 using a threaded nut or clamp 111.

Those of ordinary skill in the art will recognize that the wheel balancer wheel centering components described herein may be utilized as components in a system for centering, mounting, and clamping vehicle wheels or other rotating bodies onto a rotating shaft, such as a balancer spindle or lathe spindle. The system of the present invention preferably includes a set of double low-tapers cones 10 arranged and identified according to taper sizes. A guide or application chart is provided to identify an appropriate centering cone 10 from the set for a given vehicle wheel pilot hole inner diameter. To secure the vehicle wheel upon the balancer spindle 100 in a centered manner with the selected centering cone 10, an flange plate 200 is provided with a set of mounting pins 202 having contact tips for engaging the vehicle wheel lug holes 204. The combination of the flange plate and mounting pins 202 provides for infinite adjustment of the mounting pin contact tips within a predetermined range, accommodate any of a variety of vehicle wheel lug hole patterns. With the centering cone 10 and wheel 104 positioned on the balancer spindle 100, the mounting flange plate 200 is positioned on the spindle 100, and the mounting pins 202 disposed in corresponding engagement with the wheel lug holes 204. A threaded nut or clamp 111 is then positioned on the spindle 100, and tightened to clamp the mounting flange plate and mounting pins 202 against the wheel 104, centering it on the centering cone 10 for balancing.

The present invention can be embodied in-part in the form of computer-implemented processes and apparatuses for practicing those processes. The present invention can also be embodied in-part the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A centering cone for mounting a rotating body on a shaft, comprising:
    a central bore in said centering cone for axially guiding said centering cone on said shaft;
    a first frustoconical outer surface coaxial with said central bore, having a first minimum diameter adjacent a first end of said centering cone;
    a second frustoconical outer surface coaxial with said central bore, having a second minimum diameter adjacent a second end of said centering cone, opposite said first end;
    a first frustoconical outer surface maximum diameter separated from a second frustoconical outer surface maximum diameter by at least one annular surface disposed between said first and second ends of said centering cone, said first frustoconical outer surface, said at least one annular surface, and said second frustoconical outer surface continuous between said first and second ends of said centering cone; and
    at least one identifying indicia disposed on said annular surface of said centering cone.

2. The centering cone of claim 1 wherein at least a portion of said annular surface is colored.

3. The centering cone of claim 1 wherein said at least one identifying indicia includes a plurality of circumferential grooves disposed in said annular surface.

4. The centering cone of claim 1 wherein said identifying indicia includes at least one circumferential groove disposed in said annular surface.

5. The centering cone of claim 1 wherein said annular surface is recessed.

6. A centering cone for mounting a rotating body on a shaft, comprising:
    a central bore in said centering cone for axially guiding said centering cone on said shaft;
    a first frustoconical outer surface coaxial with said central bore, having a first minimum diameter adjacent a first end of said centering cone;
    a second frustoconical outer surface coaxial with said central bore, having a second minimum diameter adjacent a second end of said centering cone, opposite said first end; and
    at least one identifying indicia disposed on a surface of said centering cone, said at least one identifying indicia including at least one annular channel disposed on an end face of said centering cone concentric with said central bore.

7. The centering cone of claim 6 wherein said at least one annular channel is colored.

8. The centering cone of claim 6 wherein said at least one identifying indicia includes a plurality of annular channels disposed on an end face of said centering cone, each of said plurality of annular channels concentric with said central bore.

9. A method for selecting a centering cone from a set of centering cones for use in mounting a vehicle wheel on a vehicle wheel balancer spindle, each of said centering cones in said set of centering cones having a double frustoconical outer surface and at least one identifying indicia unique within said set of centering cones, comprising:

identifying a pilot hole inner diameter associated with said vehicle wheel;

correlating said pilot hole inner diameter with a plurality of frustoconical minimum and maximum diameters associated with said centering cones in said set of centering cones to identify at least one centering cone having a frustoconical minimum diameter less than said pilot hole inner diameter and a frustoconical maximum diameter greater than said pilot hole inner diameter;

displaying the identifying indicia corresponding to said identified centering cone; and selecting the centering cone having said displayed identifying indicia from said set of centering cones.

10. A centering cone storage and selection system for organizing a set of centering cones each having at least one frustoconical outer surface adapted to facilitate mounting of an annular body having a pilot hole about an axial shaft, comprising:

an identification means associated with the set of centering cones;

a measurement device operatively coupled to said identification means, said measurement device configured to obtain a measurement representative of an annular body pilot hole inner diameter;

a rack having a plurality of centering cone holders, each of said plurality of centering cone holders labeled to receive a predetermined centering cone;

a plurality of indicator lights on said rack, each of said indicator lights associated with a centering cone holder;

wherein said identification means is further configured to respond to a measurement obtained by said measurement device to identify a centering cone having a frustoconical outer surface diametrical dimension range overlapping said obtained measurement of said annular body pilot hole inner diameter; and wherein said identification means further includes a logic circuit operatively coupled to each of said plurality of lights and configured to respond to said measurement obtained by said measurement device to illuminate an indicator light associated with a centering cone holder labeled to receive said identified centering cone.

* * * * *